Aug. 12, 1969 C. W. ALLEN 3,460,576
PRESSURE REGULATING CONTROL VALVE DEVICE
Filed Dec. 28, 1966
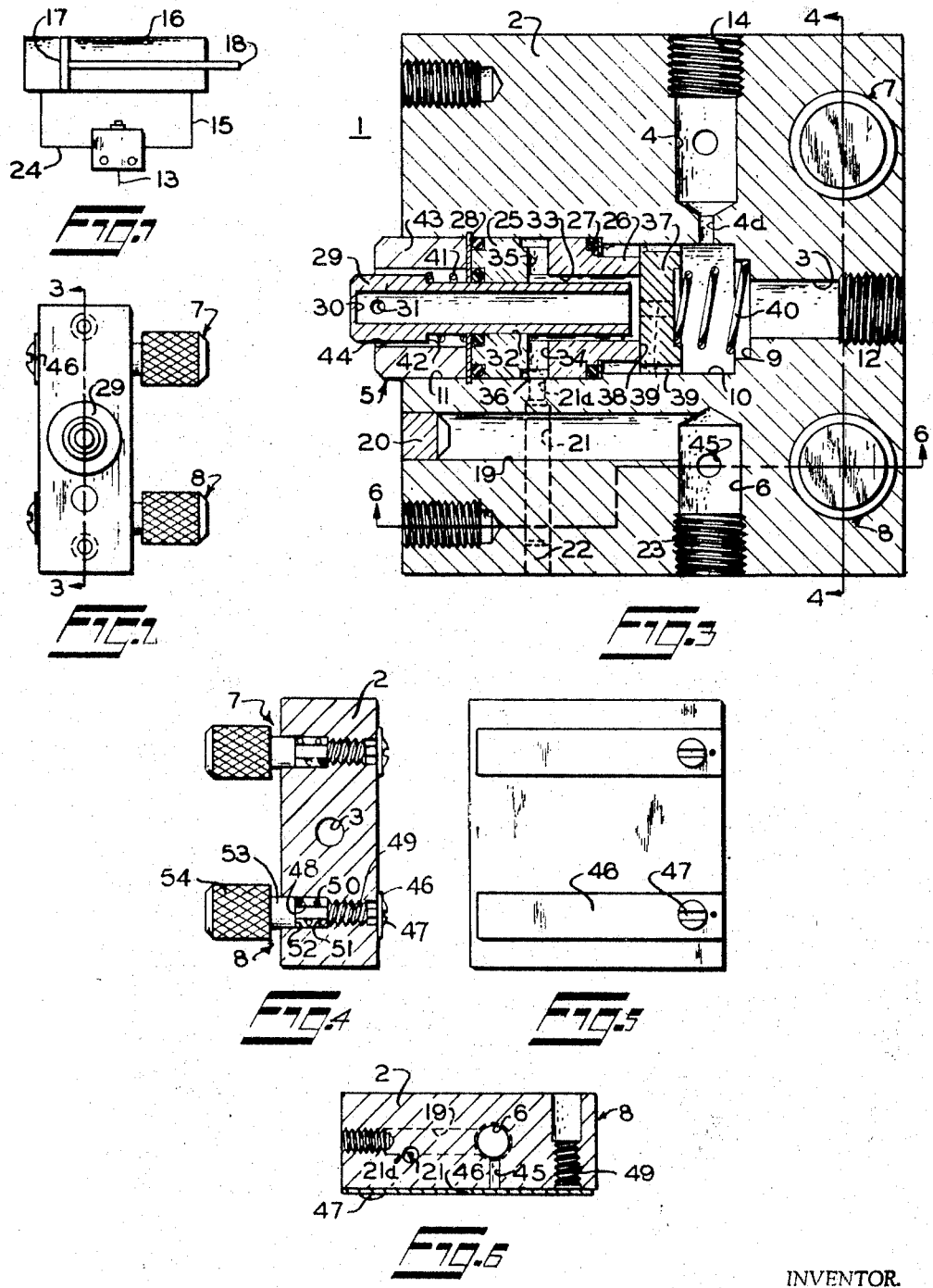
INVENTOR.
CLIFFORD W. ALLEN
BY Ralph W. McIntire, Jr.
ATTORNEY

United States Patent Office

3,460,576
Patented Aug. 12, 1969

3,460,576
PRESSURE REGULATING CONTROL VALVE DEVICE
Clifford W. Allen, Lexington, Ky., assignor to Westinghouse Air Brake Company, Wilmerding, Pa., a corporation of Pennsylvania
Filed Dec. 28, 1966, Ser. No. 605,360
Int. Cl. F16b *13/04;* F16k *11/06*
U.S. Cl. 137—627.5                    10 Claims

ABSTRACT OF THE DISCLOSURE

A pressure regulating control valve device for delivering fluid pressure to opposite ends of a reciprocating cylinder via two delivery passages. One delivery passage constantly provides fluid pressure to one end of the cylinder. A higher pressure in the other delivery passage is selectively delivered to the other end of the cylinder via manual operation of a poppet type valve. The relative pressures in the delivery passages are selected and determined by manual operation of an adjustable bleed mechanism associated with each delivery passage. The bleed mechanism has a very wide range because of its structure comprising a leaf spring on the exterior of the housing biased to cover the exterior opening of a bleed passage, and a threaded stem threadedly disposed for axial movement in a threaded bore in the housing to adjust the deflection of the spring relative to the bleed passage opening, the smallest diameter of the bleed passage being greater than the smallest passage restriction upstream thereof.

---

This invention relates generally to a pressure regulating control valve device, and relates more specifically to such a valve device operable to control the flow of fluid under pressure to the opposite ends of a fluid power cylinder.

An apparatus for delivering fluid pressure from a common source to opposite ends of a reciprocating cylinder via two delivery ports. Pressure constantly supplied through one delivery port is overridden by higher pressure selectively delivered through the other delivery port. Adjustable bleed means in each delivery port controls the delivery pressure to determine the pressure differential desired to operate the cylinder.

It is an object of the present invention to provide in a control valve device for constantly delivering fluid under pressure through a first delivery port to one side of a reciprocating piston in a cylinder and selectively delivering an overriding pressure through a second delivery port to the other side of the piston a means for quickly and accurately adjusting the relative pressure in the two delivery ports to thereby obtain the desired pressure differential acting on the piston in the reciprocating cylinder.

In the present invention, this object is achieved by providing in a housing a first delivery passage directly communicating with a supply passage and adapted for connection to the fluid pressure chamber on one side of a piston in a fluid power cylinder device, a second delivery passage for connection to the fluid pressure chamber on the opposite side of the piston and disposed for communication with the supply passage by way of a poppet type valve normally biased to a first position in which the second delivery passage is severed from the supply passage and communicated with an exhaust passage, and moveable to a second position in which the second delivery passage is communicated with the supply passage and severed from the exhaust passage. In order to select a sufficiently greater overriding pressure in said second delivery passage relative to said first delivery passage to effect movement of the piston in opposition to the pressure in the first delivery passage, each delivery passage is provided with an adjustable bleed device comprising a leaf spring attached at one end to the exterior of the housing so as to dispose the intermediate portion of the spring to close the exterior operning of a bleed orifice in the housing communicating with the corresponding delivery passage, and an axially adjustable stem threadedly received in a through bore in the housing for engaging underside of the corresponding leaf spring to raise and lower the leaf spring relative to the opening of the bleed orifice, depending on the direction of rotation of the stem, to thereby adjust the rate of bleed from the corresponding delivery passage and through the bleed passage opening between the underside of the leaf spring and the surface of the housing.

These and other objects will become more readily apparent from the following description, taken in conjunction with the drawing, in which:

FIG. 1 is a schematic representation of portions of a fluid power system including the pressure regulating control valve comprising the invention;

FIG. 2 is a side elevational view of the pressure regulating control valve of this invention;

FIG. 3 is a partial sectional view, on enlarged scale, of the pressure regulating control valve of FIG. 2 taken along the line 3—3 of FIG. 2;

FIG. 4 is a sectional view, on reduced scale, of the pressure regulating control valve of FIG. 2, taken along the line 4—4 of FIG. 3;

FIG. 5 is a side elevational view of the pressure regulating control valve taken from the right of FIG. 4; and FIG. 6 is a partial sectional view, on a reduced scale, of the pressure regulating control valve of FIG. 2, taken along the line 6—6 of FIG. 3.

Referring now to the drawings, there is shown a pressure regulating control valve device, generally indicated at 1, comprising a housing 2 having disposed therein a supply passage 3, a first delivery passage 4 in communication with the supply passage, a poppet type valve generally indicated at 5 and operable to selectively connect a second delivery passage 6 either to the supply passage or to exhaust, and a pair of identical adjustable bleed mechanisms generally indicated at 7 and 8, one for each of the first and second delivery passages, to adjust the pressure in the corresponding delivery passage.

Referring now to FIG. 3 of the drawings, it will be observed that the housing 2 is provided with a substantially centralized bore 9 having a first counterbore 10 and a second counterbore 11 opening at the left side of the housing 2. The inner end of bore 9 and the inner end of counterbore 10 together comprise a pressure chamber communicable with an externally disposed source of fluid pressure, not shown, by way of aforementioned supply passage 3 coaxially aligned with bore 9 and extending through the other side of the housing and internally threaded at 12 for attachment to a pipe fitting and fluid pressure line represented by 13 in FIG. 1 and leading to the fluid pressure source.

The aforementioned first delivery passage 4 extends through the top of the housing and communicates by way of a necked portion 4a directly with counterbore 10 for directly receiving pressure from supply passage 3. The delivery passage 4 is threaded at 14 for receiving a pipe fitting and associated fluid delivery line represented by 15 in FIG. 1 leading to one end of a fluid pressure operated reciprocating cylinder 16 having a piston 17 and a rod 18 reciprocably disposed therein.

The aforementioned second delivery passage 6 extends inwardly from the bottom of housing 2 and includes as part thereof an intersecting bore 19 plugged at 20, which bore 19 is intersected by a passage 21 plugged at 22 and intersecting aforementioned counterbore 11 at necked portion 21a so that the combined passages 6, 19 and 21 and 21a comprise the delivery passage communicating with the pressure supply passage 3 by way of the hereinafter described poppet valve 5. Delivery port 6 is provided with threads 23 for connection with a combined pipe fitting and pipe represented at 24 in FIG. 1 and connected to the opposite end of the cylinder 16.

In order to selectively effect the application of fluid pressure in pressure passage 3 to the delivery port 6 or to effect exhaust of fluid pressure from delivery port 6, the aforementioned poppet type valve 5 is disposed in bore 9 and associated counterbores 10 and 11. The poppet valve 5 comprises a cylindrical main body 25 disposed in the counterbore 11 and having an axially extending necked portion 26 extending into counterbore 10 with substantial predetermined clearance. The body 25 is fixedly disposed in counterbore 11, firstly, by way of a transversely disposed washer 27 seated on the shoulder dividing counterbores 10 and 11 in axial engagement the one end of the body 25, and secondly, a split ring 28 seated in an appropriate peripheral groove in the wall of counterbore 11 in axial engagement with the other end of main body 25. A combined exhaust stem and valve operator 29 having an axial fluid exhaust bore 30 communicating at the bottom thereof with a radially disposed exhaust port 31 is slidably received in an axial through bore 32 in the main body 25, the through bore having a counterbore 33 opening through the necked portion 26 of the body 25, the counterbore comprising a fluid passage concentrically disposed with the stem 29 and communicating at the bottom thereof with a plurality of radial passages 34, 35 which intersect at their outer ends with a peripheral neck portion 36 on the main body 25, which neck portion is disposed in lateral registration with the end of the aforementioned passage 21a at the intersection thereof with the counterbore 11. A cylindrical valve member 37 is disposed in the counterbore 10 for axial movement therein and is normally biased into axial seating engagement with the transverse end 38 of necked extension 26 of the main body to prevent flow of fluid under pressure from pressure passage 3 through bores 33 and 34 to delivery port 6. The valve member 37 includes on the periphery thereof a plurality of axially extending grooves 39, the depth of which is narrower than the aforementioned clearance between the outer periphery of neck portion 26 and the wall of counterbore 10 to provide for flow of fluid under pressure from fluid pressure passage 3 to bores 33 and 34 to delivery port 6 only when the valve 37 is unseated relative to its seat 38 in opposition to compression spring 40 disposed between valve 37 and bore 9. A spring 41 is disposed between the snap ring 28 and a shoulder 42 on the outer portion of stem 29 for normally biasing the stem 29 into the position shown to thereby vent delivery port 6 to atmosphere via passages 19, 21, 21a, 36, 34, 33, 30 and 31, and to permit spring 40 to seat valve 37 on seat 38. A cylindrical cap 43 having a through bore 44 is press fitted in the end of counterbore 11. When the stem 29 is axially depressed, either manually or by a mechanism, not shown, the open end of the exhaust bore 30 in stem 29 seats on valve 37 to close off exhaust passages 30 and 31, and upon further depression unseats valve 37 to pass fluid under pressure through grooves 39, passages 33, 34, 21, 19 to delivery port 6.

In order to adjust the relative fluid pressures in delivery passages 4 and 6, and therefore in the opposite ends of cylinder 16, the aforementioned adjustable bleed or chock mechanisms 7 and 8 are provided, one for each of the delivery passages 4 and 6, respectively. The adjustable bleed mechanisms 7 and 8 are identical; therefore, only one such mechanism 8 will be described in detail, it being understood that the description thereof is equally applicable to mechanism 7.

The adjustable bleed mechanism 8 comprises a bleed passage 45, FIG. 6, communicating the delivery port 6 with atmosphere at the rear surface of the housing 2, a leaf spring 46 attached to the rear of the housing 2 as by a screw 47 with the intermediate portion of the spring overlying and closing the bleed passage 45, and a threaded stem 48 threadedly received through the front face of the housing 2 into a threaded through bore 49. To maintain the stem 48 in any adjustable position, the stem 48 is tightly engaged with the threaded bore 49 by means of a coil spring 50 compressed between the bottom of a counterbore 51 of bore 49 and a shoulder 52 formed between an enlarged portion 53 of the stem, which enlarged portion is slidably received in counterbore 51. A large knurled head portion 54 is disposed on the end of the stem 48 exteriorly of the housing 2 for effecting rotation of the stem to axially adjust the screw.

In the operation of the adjustable bleed means, when the stem 48 is threaded into the bore 49 and outwardly of the rear face of housing 2 into engagement with the end portion of the leaf spring 46, the spring is raised away from bleed passage 45 to permit exit of delivery pressure therefrom at an adjusted rate depending on the vertical distance of the underside of the leaf spring away from the opening of the bleed passage, thus, effectively varying the size of the bleed passage depending upon the axial position of the screw.

In order to provide a wide range of bleed rates for a relatively small axial range of positions of the stem 48, the diameter of the bleed passage 45 is preferably several times larger than delivery passage portion 21a, that is, the smallest diameter of bleed passage 45 is several times larger than the smallest diameter of that portion of the delivery passage 21a, disposed between the bleed passage 45 and the supply passage 3. It is seen that the larger the bleed passage 45 is relative to the small passage 21a, the greater will be the pressure range for any given range of deflection of leaf spring 46 away from the opening to the bleed passage 45. Stated another way, the larger the bleed passage 45, the greater the relative pressure drops at delivery passage 6 for any given deflection of the spring 46. This construction of the bleed mechanisms 7 and 8 provides for a wide range of pressure differentials between delivery ports 4 and 6 so that effective pressure differentials may be readily selected in accordance with the pressures and pressure differentials desirable to effectively operate any one cylinder device or a wide variety of different cylinder devices having different pressure requirements. Preferably, passages 21a and 4a are the same size to establish identical pressure control ranges for the bleed mechanisms 7 and 8.

In the operation of the bleed mechanisms 7 and 8, bleed mechanism 7 is adjusted to provide the desired pressure on the right side of piston 17 of FIG. 1 to move the piston to the left, and the bleed mechanism 8 is adjusted to provide the desired greater pressure on the left side of piston 17 to return the piston to the right in response to depression of the stem 29 in the poppet valve 5. Thereafter, release of stem 29 will sever communication between supply passage 3 and delivery passage 6 and connect the delivery passage 6 to atmosphere whereupon the left side of piston 17 is vented so that the prevailing pressure on the right side of the piston will again move the piston to the left.

Having now described the invention, what I claim as new and desire to secure by Letters Patent is:

1. An adjustable bleed device for a fluid pressure system, comprising:
 (a) a housing having a fluid passage extending therethrough for connection at its opposite ends with fluid pressure passages in a fluid pressure system,
 (b) a bleed passage in said housing intersecting said passage and having an opening on an exterior surface of said housing,
 (c) means overlying said opening and adjustably disposable at different distances relative to said surface to affect the rate of fluid flow from said opening between said overlying means and said surface in accordance with the selected one of said distances, and (d) means for selectively adjusting the distance between said overlying means and said surface.

2. The adjustable bleed device recited in claim 1, in which said overlying means comprises a flat member attached to said housing at a point displaced from said opening and biased into engagement with said surface to normally substantially close said opening.

3. The adjustable bleed device as recited in claim 2, in which:
  (a) said flat member comprises a leaf spring inherently biased to close said opening, and
  (b) said adjusting means comprises a shaft threadedly received in a threaded bore in said housing and disposed for axial movement upon rotation thereof to adjust the deflection of said spring relative to said surface.

4. The adjustable bleed device as recited in claim 3, which spring means are disposed between said housing and said threaded shaft to bias said shaft into tight engagement with the threaded bore in a direction axially of said shaft.

5. The adjustable bleed device as recited in claim 1, in which the smallest cross-sectional area of said bleed passage is larger than the smallest cross-sectional passage area upstream of said bleed passage.

6. The adjustable bleed device as recited in claim 5, in which said smallest cross-sectional area of said bleed passage is several times larger than said smallest cross-sectional passage area upstream thereof.

7. A fluid pressure regulating control valve device, comprising:
  (a) a housing having a pressure supply passage therein,
  (b) a first delivery passage in said housing communicating with said supply passage,
  (c) a second delivery passage in said housing,
  (d) valve means selectively operable in a first mode to communicate said second delivery passage with said supply passage and a second mode to communicate said second delivery passage to exhaust, and
  (e) bleed means associated with each of said first and second delivery passages for adjusting the rate of bleed from the corresponding delivery passage means to correspondingly adjust the fluid pressure in the corresponding delivery passage.

8. The fluid pressure regulating control valve device as recited in claim 7, in which each of said bleed means comprises:
  (i) bleed passage means in said housing intersecting said delivery passage and having an opening on an exterior surface of said housing,
  (ii) means overlying said opening and adjustably disposable at different distances relative to said surface to effect the rate of fluid flow from said opening between said overlying means and said surface in accordance with the selected one of said distances, and
  (iii) means for selectively adjusting the distance between said overlying means and said surface.

9. The fluid pressure regulating control valve device as recited in claim 8, in which:
  (a) said overlying means comprises a leaf spring attached to said housing at a point displaced from said opening and inherently biased to substantially close said opening by engagement with said surface, and
  (b) said adjusting means comprises a shaft threadedly received in a threaded bore in said housing and disposed for axial movement by rotation thereof to adjust the deflection of said spring relative to said surface.

10. The fluid pressure regulating control valve device as recited in claim 9, in which:
  (a) the smallest cross-sectional area of each of said bleed passages are identical and are larger than the smallest cross-sectional area upstream of each of said bleed passages, and
  (b) said smallest cross-sectional passage area upstream of each of said bleed passages being identical.

References Cited

UNITED STATES PATENTS

| 1,393,258 | 10/1931 | Carhart | 137—473 |
| 1,836,816 | 12/1931 | Riesz | 84—363 |
| 2,237,013 | 4/1941 | Stanbury | 137—473 |

LEONARD D. CHRISTIAN, Primary Examiner

U.S. Cl. X.R.

251—205, 321